May 29, 1934. R. J. MEUNIER 1,960,748
IDENTIFICATION OF PIPING SYSTEMS
Filed April 1, 1931
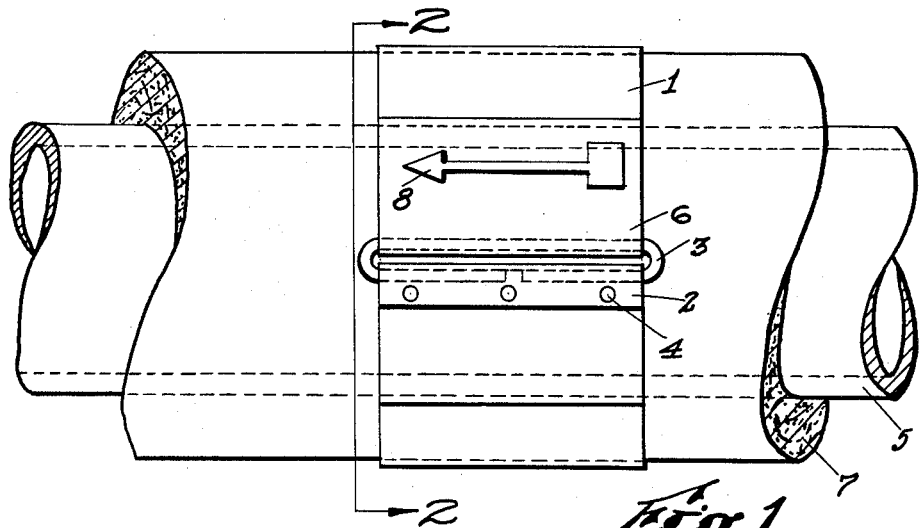
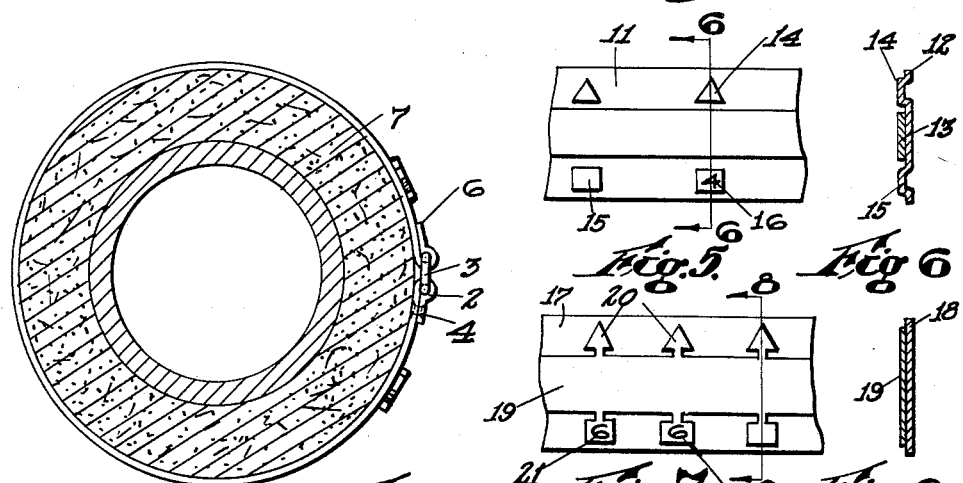
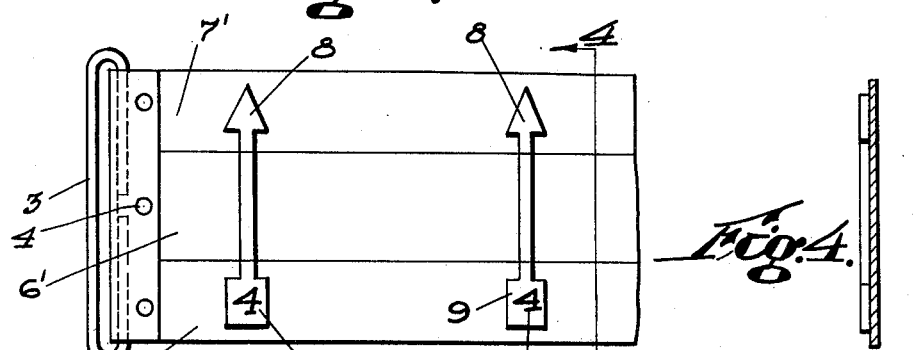
Inventor:
Roland J. Meunier
By Fowler & Kennedy
Attorney Patented May 29, 1934

1,960,748

UNITED STATES PATENT OFFICE 1,960,748

IDENTIFICATION OF PIPING SYSTEMS

Roland J. Meunier, Southbridge, Mass.

Application April 1, 1931, Serial No. 526,964

5 Claims. (Cl. 40—21)

The present invention relates to a method and apparatus by which piping systems may be readily marked to permit easy identification of individual pipe lines in the system.

At present in complex piping systems as, for example, in stationary and marine power plants, the general practice in identifying pipe lines is to paint with contrasting colors the pipes containing various fluids, each fluid being identified through its connections by a single color. In many power plants the range of colors is not as great as the number of fluids carried in the pipes and complete identification of each fluid is accordingly impossible. The expense of painting such piping systems is extremely high, particularly in systems which are exposed to dust and dirt and therefore require frequent repainting, or in insulated piping systems, painting of the latter being expensive because of the absorptive properties of the insulation whereby a large amount of paint is required to procure a suitable covering on the insulation. This painting of pipes in various colors leads to unnecessary waste in plants in which changes or repairs are frequently necessary, since a pipe used in carrying one fluid and painted such a color as to indicate the fluid therein cannot subsequently be used for another fluid and be properly identified without being entirely repainted. There is, furthermore, no satisfactory system at present of indicating the direction of flow of the fluid within the pipe. The method in general use involves the painting of an arrow on the pipe, and such an arrow is soon covered with dust and dirt or is concealed beneath a new coat of paint, thus destroying its utility. In insulated piping systems, as well as in pipe lines having a large number of different sizes of pipes, it becomes desirable to identify the diameter of the pipe, either where it is covered by the insulation, or where the pipe line changes from one diameter to another. The size of pipe at present can be determined only by removal of the insulation or by direct measurement of the pipe.

According to the present invention, the aforesaid objections are overcome by the provision of a plurality of flexible bands of distinctive color applied circularly to the pipe line a different color of band being used for each different material in various pipe lines. In the case of a system carrying a large number of fluids, combinations of colors on each band are desirable. The band may, if desired, carry an arrow or other direction indicating means thereon in order to indicate the direction of flow of material within the pipe, or the band may carry a number or other character stamped on the band to indicate the size or diameter of the pipe to which the band is applied or in the case of steam lines or lines containing electric wiring, the pressure or the voltage. The invention further includes the provision of a readily attachable or removable band by which the expense and difficulty of providing a completely identified piping system is materially reduced. Further and additional advantages will appear from the following description taken in connection with the accompanying drawing in which:—

Fig. 1 is an elevational view of a section of pipe line showing a band embodying the invention applied thereto.

Fig. 2 is a sectional view along the line 2—2 of Fig. 1.

Fig. 3 is a plan view of a portion of a band embodying the invention before it is applied to a pipe.

Fig. 4 is a sectional view along the line 4—4 of Fig. 3.

Fig. 5 is a plan view of a portion of a band showing a modification.

Fig. 6 is a sectional view along the line 6—6 of Fig. 5.

Fig. 7 is a plan view of a portion of a band showing a second modification.

Fig. 8 is a sectional view along the line 8—8 of Fig. 7.

Like reference characters refer to like parts throughout the drawing.

Referring to Figs. 1 and 2, the band 1 includes a relatively wide strip of flexible material having one end 2 inserted through an elongated loop 3 and folded over upon and permanently secured to itself by any suitable securing means such as rivets 4. The band is adapted to be wrapped circularly around a pipe 5 as shown in these figures and the end of the band 6 remote from the end 2 is adapted, after the band is placed around a pipe, to be inserted through the elongated loop and folded back upon itself whereby the band is secured firmly around the pipe. In the construction shown, a layer of insulation 7 extends around the pipe 5, and the band is applied externally of the insulation. The band is, however, applicable as readily to uninsulated pipes as to the insulated pipe shown.

A series of similar bands are adapted to be attached to the pipe line at spaced intervals; in the usual construction they are placed adjacent bends or valves in the pipe and adjacent connections with other pipes. The bands on pipe lines containing different fluids are each marked with a distinctive color to indicate the fluid within the corresponding pipe. In the case of complex piping systems, since the number of primary colors used for identification is not great enough, the bands are painted in strips of contrasting colors as, for example in Fig. 3, the band has a central stripe 6 of one color and edge stripe 7 of a contrasting color. The combination of two colors in this manner permits of a large number of color combinations, thereby providing a large number of distinct bands which may be used for marking a correspondingly large number of pipe lines.

In order to indicate the direction of flow of liquid within the pipe to which the band is applied, a direction indicating means as, for example, the arrow 8, Figs. 1 and 3, is stamped on or pressed in the band and the band is subsequently applied to the pipe with the arrow pointing in the direction of flow. In a construction in which the piping is insulated, or in certain other constructions an indicating character may be applied in any desired manner to the band to indicate, for example, the size of the pipe beneath the insulation. In the construction of Fig. 3, the tail end of the arrow 8 provides a substantially rectangular portion 9 on which the numeral 10 is formed, although the invention is not limited to such particular construction.

Referring to the construction of Figs. 5 and 6, the band 11 comprises two strips of flexible material, a wide strip 12 and a narrow strip 13 in superimposed relation; the strips are rigidly secured together at the end which is permanently attached to the elongated loop, as in the construction of Fig. 1, and which may, if desired, be suitably secured together as by a suitable adhesive throughout their entire length. The wide strip 12 is provided adjacent one edge with a series of substantially triangular shaped protuberances 14 formed by a stamping or other forming action, and adjacent the opposite edge with a series of substantially square or rectangular protuberances 15 by a similar action. These protuberances provide an indicating means similar to the arrows of Figs. 1 and 3, the triangular protuberance pointing in the direction of flow, when the band is attached to a pipe. Size or other indicating means 16 may be applied to the rectangular protuberances 15 or in any other desired manner. The narrow strip 13 of this construction is preferably of a contrasting color to the color of the wide strip 12, thereby forming, when the strips are secured together, a completed band of two contrasting colors. The protuberances 14 and 15 maintain the narrow strip in desired relation centrally of the wide strip.

In the construction of Figs. 7 and 8, the band 17 is made up of a wide strip 18 and a superimposed narrow strip 19 rigidly secured together at the end which is permanently fastened to the elongated loop; the strips may, if desired, be adhesively secured together throughout their entire length. The narrow strip 19 is composed of a series of interconnected similarly-shaped figures; in the construction shown, the interconnected figures are arrows 20 by which to indicate the direction of flow of material within the pipe to which the band is applied. Size indicating means 21 may be provided on the tail of the arrow for indicating the size of the pipe, in the manner above set forth. The wide and narrow strips are preferably of contrasting colors forming, when assembled, a band of two separate colors, the center portion being of one color and the edge portions being of a contrasting color.

Other constructions of the narrow strip may be provided and the configuration of the narrow strip may be varied in any suitable manner, as, for example, the narrow band may comprise a series of interconnected discs to indicate a particular material within the pipe or it may be of a zigzag shape to indicate that electric power is carried by wires within the pipe. Furthermore, the indicating characters applied to the band either on the tail of the arrow or in any other position may indicate, instead of the diameter of the pipe, such factors as the voltage of the electric power within the pipe or the pressure of the fluid within the pipe.

Accordingly it will be seen that the band of this construction is arranged to identify by characteristic marking thereon not only the separate pipe lines of piping systems in power plants, both stationary and marine, but may as readily be used in any system where it is desirable that a series of pipe or conduits containing various fluids be provided with some distinguishing characteristics.

I claim,

1. A band for circumferential application to a conduit, comprising a wide strip and a narrow strip in superposed relation with said wide strip, said strips being permanently secured together at one end, and being of contrasting colors, and means for indicating the direction of flow and size indicating means formed on said strips.

2. A band for circumferential application to a conduit, comprising a wide strip and a narrow strip in superposed relation with said wide strip, said strips being permanently secured together at one end, and being of contrasting colors, means for indicating the direction of flow, and means for indicating the size of pipe formed on the wide strip adjacent opposite edges and providing upwardly extending projections, said projections acting to prevent lateral movement of said superposed narrow strip.

3. A band for circumferential application to a pipe line comprising a wide strip and a narrow strip in superposed relation with said wide strip, said strips being permanently secured together at one end and being of contrasting colors, said narrow strip comprising a series of interconnected figures of similar configuration.

4. A band for circumferential application to a conduit, comprising a wide strip, a narrow strip in superposed relation to said wide strip, said strips being secured together at least at one end, and being of contrasting colors, one of said strips embodying means for indicating the direction of flow within the conduit.

5. A band for circumferential application to a conduit, comprising a wide strip and a narrow strip in superposed relation to said wide strip, said strips being secured together and being of contrasting colors, one of said strips embodying means for indicating the direction of flow within the conduit.

ROLAND J. MEUNIER.